United States Patent
Laroche et al.

(10) Patent No.: US 8,611,358 B2
(45) Date of Patent: Dec. 17, 2013

(54) MOBILE NETWORK TRAFFIC MANAGEMENT

(75) Inventors: Stephane Laroche, Montreal (CA);
Jocelyn Le Sage, St-Colomban (CA);
Richard H. Blanchette, Hopkinton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 188 days.

(21) Appl. No.: 13/081,310

(22) Filed: Apr. 6, 2011

(65) Prior Publication Data

US 2012/0257565 A1    Oct. 11, 2012

(51) Int. Cl.
*H04L 12/66* (2006.01)
*H04J 3/22* (2006.01)
*G06F 15/16* (2006.01)

(52) U.S. Cl.
USPC ........... 370/400; 370/463; 370/466; 709/218; 709/227

(58) Field of Classification Search
USPC .......................... 370/400, 401, 409, 464–467; 709/217–219, 227–229
See application file for complete search history.

(56) References Cited

U.S. PATENT DOCUMENTS

| | | | |
|---|---|---|---|
| 2003/0026211 A1 | 2/2003 | Xu et al. | |
| 2005/0198322 A1* | 9/2005 | Takabayashi et al. | 709/228 |
| 2006/0153120 A1 | 7/2006 | Channasamudhram | |
| 2006/0182104 A1* | 8/2006 | Lee et al. | 370/389 |
| 2008/0002607 A1 | 1/2008 | Nagarajan et al. | |
| 2010/0309894 A1* | 12/2010 | Csaszar et al. | 370/338 |
| 2012/0287910 A1* | 11/2012 | Wang et al. | 370/332 |

FOREIGN PATENT DOCUMENTS

| | | |
|---|---|---|
| WO | 0176286 A1 | 10/2001 |
| WO | 2004014101 A2 | 8/2003 |

OTHER PUBLICATIONS

Kotikalapudi Sriram, et al.; "Enhanced Efficiency of Mapping Distribution Protocols in Scalable Routing and Addressing Architectures"; Aug. 2-5, 2010; IEEE; http://ieeexplore.ieee.org/stamp/stamp.jsp?arnumber=5560114.

* cited by examiner

*Primary Examiner* — Kerri Rose

(57) ABSTRACT

A method for mobile computer networking on a distributed network includes, with a network element of a local network, establishing a connection to a mobile client device, determining a home network of the mobile client device without using a logical address of a packet of data from the mobile client device, and forwarding network traffic from the mobile client device to a home network of the mobile client device in response to determining that the home network is not the local network.

14 Claims, 5 Drawing Sheets

MOBILE NETWORK TRAFFIC MANAGEMENT

BACKGROUND

An entity such as a business organization will often maintain a network for its computing systems. One type of network structure is a distributed network structure. In a distributed network structure, several sub-networks work under the direction of several different network controllers. This is opposed to a centralized structure where traffic from every computing system is managed from a central location. Distributed network systems are more efficient because broadcast traffic is only broadcast to smaller sub-networks rather than the entire network maintained by the organization. This reduces costs, uses less bandwidth, and allows for greater scalability. These sub-networks are commonly referred to as local networks.

The local networks maintained by an organization typically correspond to units within an organization. For example, the engineering department of that organization may be under one local network while the accounting department is under another local network. A network user belonging to a particular department is often issued a client computing device, such as a laptop, that is configured to work on the network of the department to which that user belongs. This network is referred to as the user's home network.

One challenge that arises with distributed network systems is managing network traffic when a user roams from one local network to another. For example, if a user from the engineering department brings his or her laptop to the accounting department and attempts to connect to the wireless network there, that laptop will no longer have access to its home network. Even if the laptop is granted access to the accounting department network, it may not have access to its home network and the services provided by that home network.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
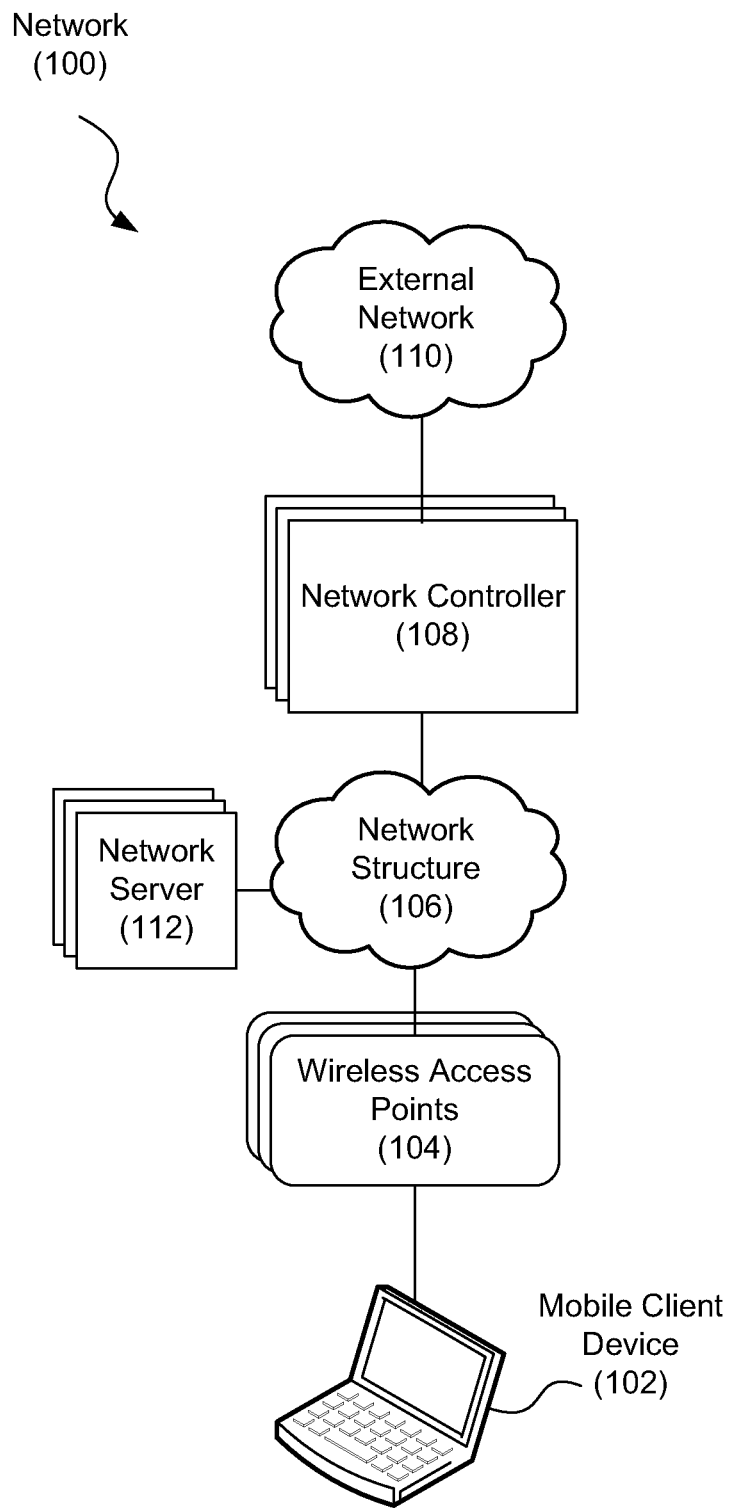
FIG. 1 is a diagram showing an illustrative network setup, according to one example of principles described herein.

As mentioned above, one challenge that arises with distributed network systems is how to manage network traffic when a user roams from one local network to another. When a mobile client device connects to a local network that is not the client's home network, that network is referred to as a foreign network. When connected to a foreign network, a mobile client device may not receive network services such as broadcasts from its home network.

Some network systems are configured to examine the packets of data from a mobile client device to determine a logical address assigned to that device. A logical address is one that is assigned arbitrarily rather than one that is associated with a physical interface of that device. One type of logical address typically assigned to devices on a network is an Internet Protocol (IP) address. However, when a mobile client device roams to a different sub-network, that IP address may no longer be valid.

In light of this and other issues, the present specification discloses methods and systems for the management of network traffic from mobile devices without having to examine the packets of data for a logical address. Particularly, the methods and systems described herein provide mechanisms for forwarding traffic from a mobile client device on a foreign network back to the home network associated with that mobile client.

According to certain illustrative examples, when a mobile client device connects to a network, a network element of that network will determine whether that mobile client device is foreign to that network. A network element is a physical computing device that includes hardware and software used for managing the flow of network traffic on a particular network. Examples of a network element may include a router, switch, or access point. A mobile client device that is foreign to the network means that the home network of that mobile client is not the same network to which it is connecting.

The network element may determine whether a mobile client connected to the network is foreign through a variety of techniques. For example, the home network of the mobile client may be determined by authenticating the mobile client through a Remote Access Dial-In User Service (RADIUS) server. Through the authentication process, the network element can receive information about the mobile client including the home network of that mobile client. Additionally or alternatively, the home network of a mobile client device may be determined based on a Service Set Identifier (SSID) provided by the client device. A more detailed description of how a RADIUS server or an SSID indicate the home network of a mobile client device will be discussed in more detail below.

If the home network of a mobile client device connecting to a particular network element is the same network managed by that network element, then no special action is needed. However, if the home network for the mobile client device is a separate network, then the network element will forward any packets of data from the mobile client device to that separate network.

This forwarding is done by pre-configuring the network elements within each local network with traffic forwarding data. The network elements may use a communication protocol such as User Datagram Protocol (UDP) to communicate with one another and share information about the networks they serve. This shared information is then used to create forwarding tables. A forwarding table tells a network element where to forward a received packet of data.

The network elements may establish network tunnels to forward traffic between different local networks. A network tunnel uses a tunneling protocol to encapsulate data and transport it over an incompatible network. When doing so, the entire packet of data is encapsulated, including data link layer information within the header of each packet. When a packet of data from a foreign mobile client is received by the network element, then that network element may forward that packet to the proper network tunnel. Through use of methods and systems embodying principles described herein, an organization can maintain a distributed network system while still providing users with the full services of their home network even when they roam and connect to other sub-networks within the organization's general network.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included in at least that one example, but not necessarily in other examples.

Throughout this specification and in the appended claims, the term "mobile client device" refers to any computing device capable of accessing a network at different locations. A mobile client device may either connect to different networks or to the same network at different locations wirelessly or through a physical connection. Examples of a mobile client device including, but are not limited to, laptop and notebook computers, tablet computers, personal digital assistants and mobile phones.

Referring now to the figures, FIG. 1 is a diagram showing an illustrative network (100). According to certain illustrative examples, the network (100) includes a number of wireless access points (104), a number of network servers (112), and a number of network controllers (108).

The wireless access point (104) is a network element that establishes connections with mobile client devices. Mobile client devices include a piece of hardware referred to as a wireless network interface card. The wireless network interface card allows the mobile client device (102) to establish a wireless data connection with the wireless access point (104). The communication of data over a wireless connection is typically done over radio waves. Other technologies such as infrared may be used as well. The wireless access point converts the data received over a wireless connection into a format to be transported over a wired network structure (106). A variety of protocols may be used such as Bluetooth™ and the family of 802.11 standards from the Institute of Electrical and Electronics Engineers (IEEE).

The network structure (106) includes all of the network elements such as routers, switches, and cables that provide functionality to the network (100). The network structure (106) also includes the physical media providing connections between the network elements. Various types of cables may be used to provide connectivity including, but not limited to, ethernet cables, coaxial cable, and fiber optical cables. Additionally, various wireless technologies may be used to connect two different network elements.

The network server (112) may provide a number of different types of services to client devices serviced by the network. For example, the network server (112) may be a Dynamic Host Control Protocol (DHCP) server. A DHCP server typically assigns IP addresses to newly connected client devices. The network server may also be a storage server to store data accessible to client devices on the network. The network server (112) may also perform certain processes for the client devices connected to the network (100).

In some cases, a network server (112) may function as a RADIUS server. A RADIUS server stores information that indicates which mobile client devices or users of those devices should be provided with access to a network. In one example, a RADIUS server receives a request for authentication. This request typically includes a user name and password. If that username and password are a valid match with credentials stored by the RADIUS server, then the RADIUS server will respond to the request within an authorization message. This authorization message may include information about the requesting device including an assigned home network. If the username and password are not valid, then the RADIUS server will send back an authorization denied message.

The network controller (108) is a network element that is responsible for managing the network. The network controller (108) may maintain a database of the physical and logical addresses for the various client devices and network elements of the network. The network controller (108) may also route network traffic to an external network (110) including the Internet. The network controller (108) may also communicate with network controllers for other networks to route traffic thereto. Some networks may be managed by more than one network controller (108).

Figure 2:
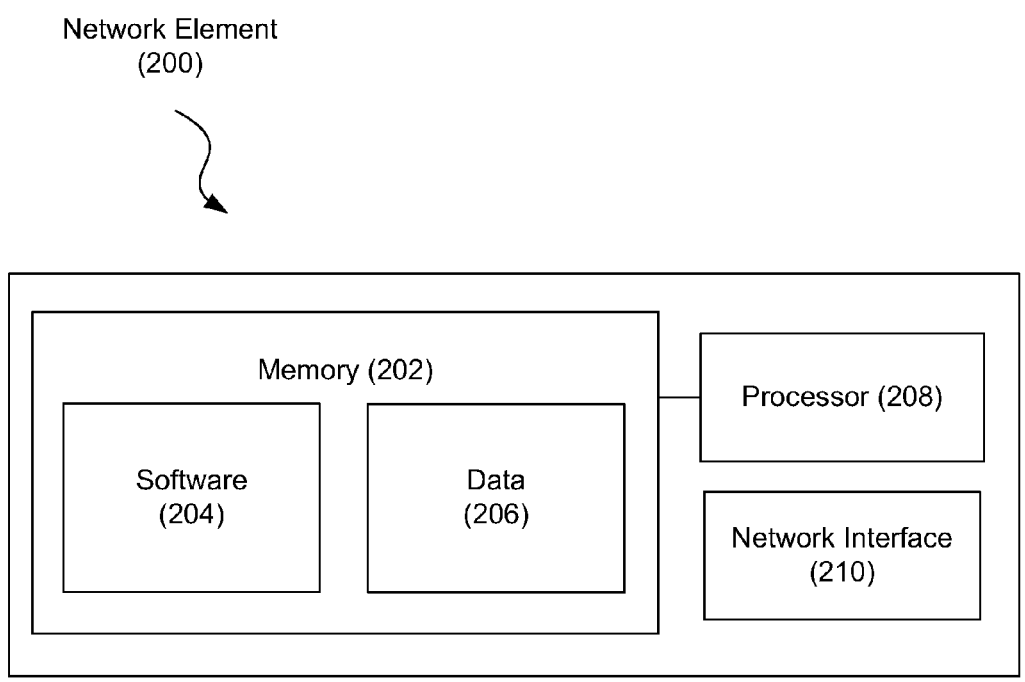
FIG. 2 is a diagram showing components of an illustrative network element, according to one example of principles described herein.

FIG. 2 is a diagram showing illustrative components of a network element (200). According to certain illustrative examples, the network element (200) includes a memory (202) having software (204) and data (206) stored thereon. The network element (200) also includes a processor (208) and a port interface (210).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (204) and data (206).

The network element (200) also includes a processor (208) for executing the software (204) and using or updating the data (206) stored in memory (202). The software (204) may include an operating system. The operating system is responsible for managing the hardware associated with the network element (200) and provides a network administrator with an interface for configuring the network element. The data (206) may include forwarding tables that tell the network element (200) where to forward incoming network traffic.

A network interface (210) includes the physical hardware that allows the network element (200) to be connected to other network elements. For example, a network element may include a number of fiber optic, coaxial, or Ethernet ports so that respective cable types may be used to connect the network element to other devices. The network interface (210) may also include a wireless interface to connect to other devices wirelessly.

Figure 3:
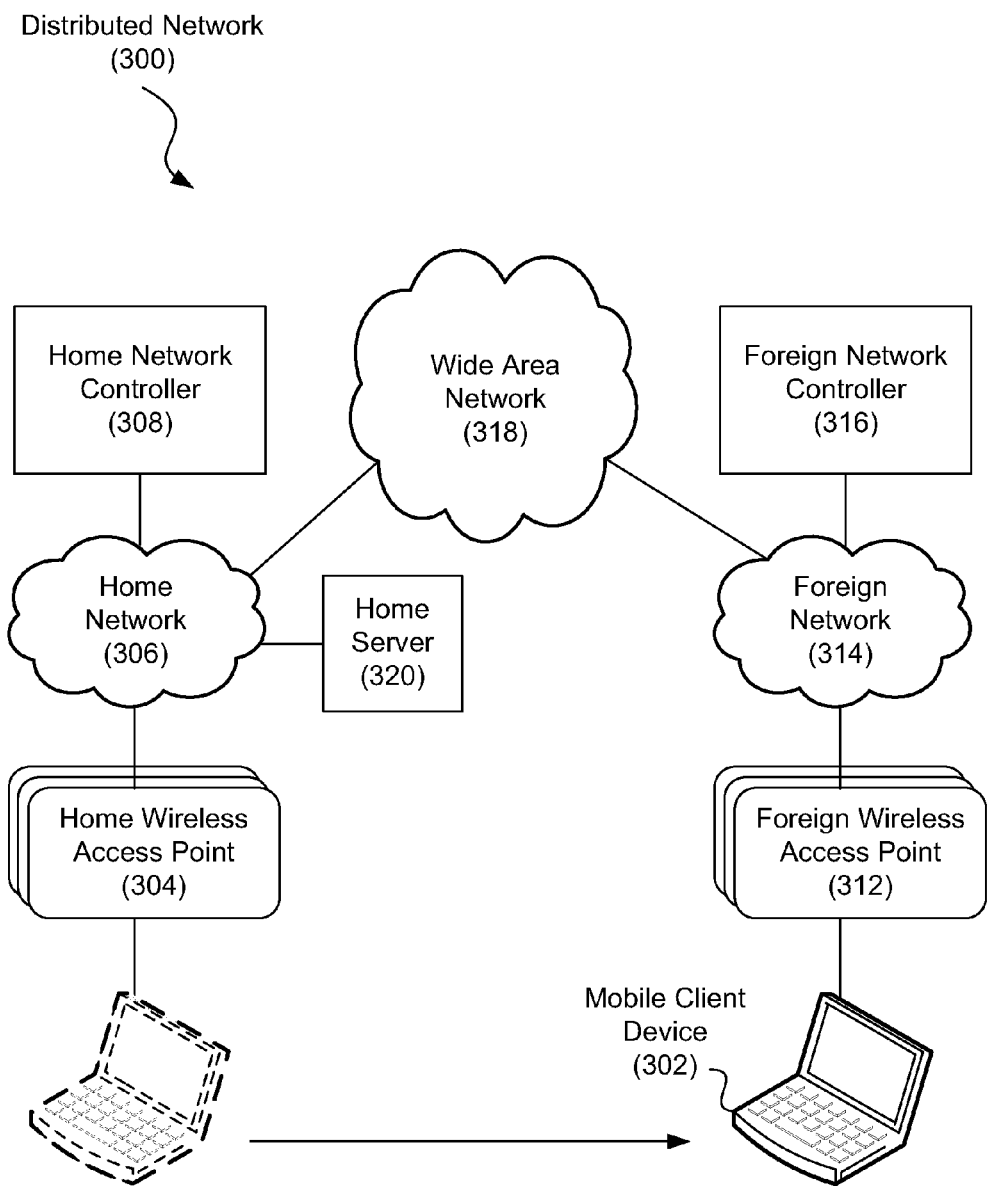
FIG. 3 is a diagram showing an illustrative distributed network system, according to one example of principles described herein.

FIG. 3 is a diagram showing an illustrative distributed network system (300). According to certain examples, an entity such as a business organization may organize its network so that several smaller networks work in correlation rather than one centralized network. The several smaller networks in correlation are often referred to as a Wide Area Network (WAN) (318). In this example, only two networks (306, 314) are illustrated. One network is the home network (306) for a particular mobile client device (302), and the other network is a foreign network (314) to that particular mobile client device (302).

A particular mobile client device (302) will typically be associated with a home network (304). The home network (304) for a particular mobile client device (302) will typically correspond to the location where the user for that mobile client device (302) is stationed. For example, if a user works in the engineering department of a business organization, the mobile client device issued to that user can be associated with the local network associated with the engineering department. This association may be recorded in the RADIUS server. Thus, when that mobile client device tries to connect to the network, the the network, the RADIUS server will respond with an authorization message that indicates the home network of that mobile client device.

A home network (306) may include one or more wireless access points (304). The wireless access point (304) establishes a wireless connection between mobile client devices within range of that mobile client device. The wireless access point (302) is configured to determine whether or not a recently connected device belongs to one of the networks serviced by that access point (302).

When a mobile client device (302) is first connected to a wireless access point (304), the user will usually provide credentials to access the network. As indicated above, these credentials are often in the form of a user name and password. The wireless access point then forwards the received credentials to a RADIUS server. The RADIUS server then determines if the credentials are valid and if so, responds with an authorization granted message.

The authorization granted message can include identifying information about the mobile client device that was just authenticated. This identifying information may include either the network name or network identification number for the home network of the mobile client device. If the home network of the mobile client device as determined from the information received from the RADIUS server corresponds to one of networks served by the wireless access point (304), then the wireless access point can forward data from the mobile client device as usual.

In some cases, the home network of a mobile client device can be determined by a Service Set Identifier (SSID) provided by the mobile client device (302). For example, the mobile client device (302) may be configured to connect to a particular SSID either automatically or manually. When a network element receives a packet of data from a mobile client with a particular SSID, then the network element can compare that SSID with a list of SSID's indicating networks served by that network element.

If the SSID of the recently connected mobile client device is found in the list of SSID's serviced by that network element, then the network traffic from that mobile client device will be forwarded to the appropriate port. A port refers to a particular input or output of a network element. The appropriate port on which a received packet of data is forwarded is determined by consulting a forwarding table. This table may be pre-configured automatically based on the exchange of information between network elements.

In some cases, the home network of a mobile client device connecting to a network based on an SSID may be a guest network. Thus, the wireless access points (304) and other network elements within a network will forward traffic from that mobile client device (302) to a guest network. In some cases, a guest network may provide a limited set of services or a limited bandwidth. In some cases, a home network assigned to a mobile client device may be a roaming staff network. Thus, network traffic from roaming mobile client devices operated by members of the organization may be automatically forwarded to a roaming staff network. This roaming staff network may provide a fuller set of services and a higher bandwidth than the guest network.

A home network for a roaming mobile client device may be assigned based on where that mobile client first connects. In some cases, this may be based on location. For example, if a mobile client device first connects to the network in a library, then that mobile client device will be associated with a library network as its home network. When the user of that mobile client device roams to a different location, then traffic from that mobile client device may be forwarded back to that library network which has been assigned to be the home network of that mobile client device.

When a mobile client device is connected to its home network, it will have access to network specific services. For example, broadcast messages are often sent to all devices on a network. A broadcasted packet of data will not, however, be broadcast to other networks. Thus, if a mobile client device (302) is connected to a foreign network (314), then it will not automatically receive broadcast messages issued by its home network. Furthermore, data that is stored on a home server (320) may only be accessible to devices on the home network (306). Thus, a mobile client device (302) not connected to its home network will not have access to that data.

The methods and systems embodying principles described herein provide a way for a mobile client device (302) that is connected to a foreign network (314) to still have access to services on its home network (306). When a mobile client device (302) roams to a foreign network and establishes a connection with a foreign wireless access point (312), that foreign wireless access point (312) will determine whether or not that mobile client device (302) is assigned to the foreign network. After determining that the mobile client device is foreign to that wireless access point (312), it will forward the traffic from that mobile client device back to its home network (306).

According to certain illustrative examples, the foreign wireless access point (312) may forward traffic from foreign networks to the foreign network controller (316). The foreign network controller (316) may be configured so that network tunnels exist between the foreign network controller (316) and other networks. The network tunnel may be established between the foreign network controller (316) and a home network controller (308) of the home network (306). A network tunnel utilizes a tunneling protocol that encapsulates packets of data for transmission across foreign networks. The encapsulation of a packet includes the data link layer information associated with that packet. When that data reaches its destination, the encapsulation is removed and the packet of data is treated as if it came from a local network. One type of network tunnel is a Virtual Private Network (VPN) tunnel.

In some cases, the individual network elements may establish tunnels to other networks. Thus, a packet of data from a mobile client device (302) may be forwarded directly to its home network rather than first being forwarded to a network controller (316).

The network tunnels throughout the wide area network (318) are pre-configured so that roaming mobile client devices (302) can readily communicate with their home networks. The network elements within a network will include additional entries in their forwarding tables. A forwarding table is used by a network element to determine where to forward a received packet of data. The additional entries can include a source physical address or a network identification number and a home port. A physical address such as a Media Access Control (MAC) address is an address that is built into a network interface of a particular device. When the network element receives a packet of data from a source physical address within the forwarding table, it will forward that packet of data to the associated output port in the table.

For example, when a packet of data from the mobile client device (302) is received by the foreign network controller (316), that network controller will consult its forwarding table. The forwarding table of the foreign network controller will include an entry for the physical address of the mobile client device (302). That physical address will correspond to a particular port on which the packet of data should be forwarded. This port may correspond to a pre-configured network tunnel. Thus, the foreign network controller (314) will forward the packet of data to that port. There may be several other network elements along the path back to the home network for the mobile client device. Each network element on the path back will consult its own forwarding table to determine how to forward the packet of data so that it properly reaches its home network (306).

In addition to forwarding traffic from a mobile client device (302) from the foreign network (314) back to its home network (306), the foreign network (314) can be configured to receive data from the home network (306) that is intended for the mobile client device (302). When a packet of data from the mobile client device is tunneled back to its home network, each network element on the path back to the home network may add an additional entry in a broadcast forwarding table. The broadcast forwarding table of a network element tells that network element where to forward an incoming packet of data. In this way, a broadcast on the home network can be transferred, though the a list of network elements, to the network where the mobile client device is roaming and to the mobile client device itself.

Figure 4A:
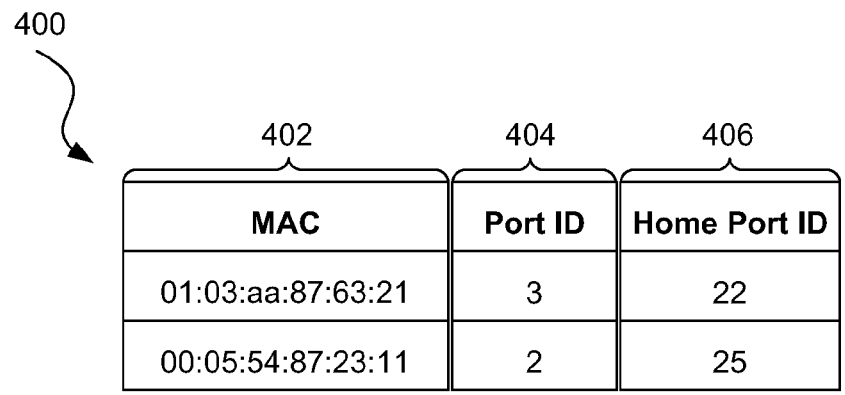
FIGS. 4A-4B are diagrams showing illustrative network traffic routing tables, according to one example of principles described herein.
Figure 4B:
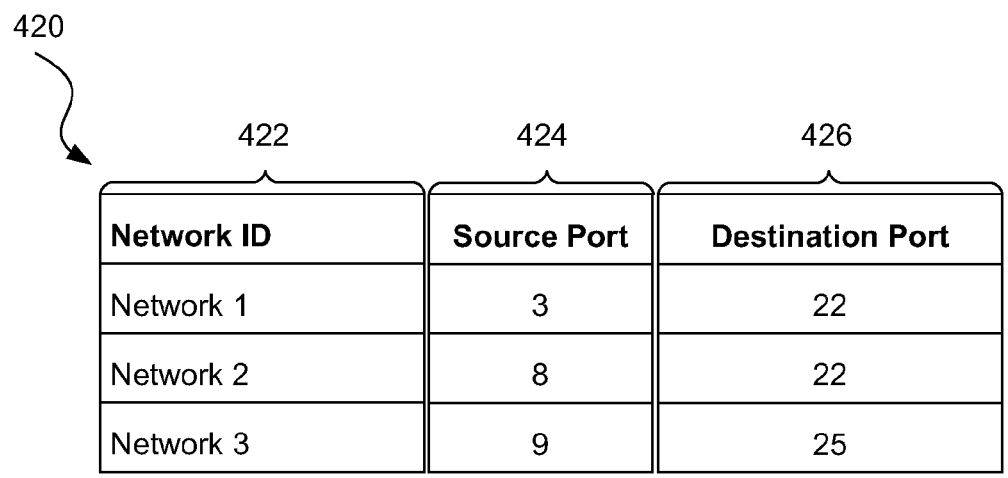

FIGS. 4A-4B are diagrams showing illustrative network traffic forwarding tables. FIG. 4A is a table (400) showing a bridge forwarding table. A network bridge is a piece of equipment that connects two different networks. According to certain illustrative examples, the bridge forwarding table includes a MAC address column (402), a port identification column (404), and a home port identification column (406).

When a mobile client device first connects to a foreign network, the network elements within that foreign network will automatically establish a path from that network back to the home network of that mobile client device. As mentioned above, this path may be established by having the network elements communicate with each other using a protocol such as UDP. By sharing information about the networks they serve, the network element are able to create network tunnels to forward traffic from a roaming mobile client device back to its home network. This may be done be creating forwarding tables for those network elements.

A network bridge is a device that builds up its table as it receives packets of data. When a bridge receives a packet of data it determines the source address of that packet as well as the port on which that packet was received. It can then add this information to a line it the forwarding table. The source address is placed in the MAC address column (402) and the source port is placed in the port identification column (404). The bridge then examines the destination address of that packet. It then checks the forwarding table to see if that destination address is in the MAC address column. If the destination address is already in the forwarding table, then it will forward that packet to the associated port in the home port identification column (406).

If the destination address is not already in the forwarding table (400), then the bridge will flood the networks connected to that bridge with a request message. The device with the destination address of the received packet will then respond to that request. Upon receiving that response, the bridge can finish the line for that initially received packet of data by filling in the home port identification column with the port on which the response was received. If the destination packet was on another network, then that response will have been received over a network tunnel. Thus, if the bridge receives future requests for that destination address, the bridge will already know which network tunnel to use for forwarding that packet of data without having to flood the networks connected to that bridge with a request message.

FIG. 4B is a diagram showing an illustrative broadcast forwarding table (420). The broadcast forwarding table is used to forward broadcast traffic from a mobile client's home network to the network where that mobile client device is currently connected. The broadcast forwarding tables are automatically built when a mobile client connects to a foreign network.

Broadcast traffic is network traffic that is destined for all devices on a network. Because some of the mobile client devices assigned to a particular home network may currently be roaming, the network should properly route the broadcast traffic to those roaming device without having to flood each network within the wide area network. According to certain illustrative examples, the broadcast forwarding table includes a network identification column (422), a source port column (424), and a destination port column (426).

When a broadcast packet is received by a network element, the network element will consult its broadcast forwarding table (420) to determine where to forward that traffic. For example, if a broadcast packet is received on source port 3, then the network element will forward that broadcast packet to destination port 22, which may be a network tunnel port. Thus, the broadcast packet will eventually reach the roaming mobile client device.

Figure 5:
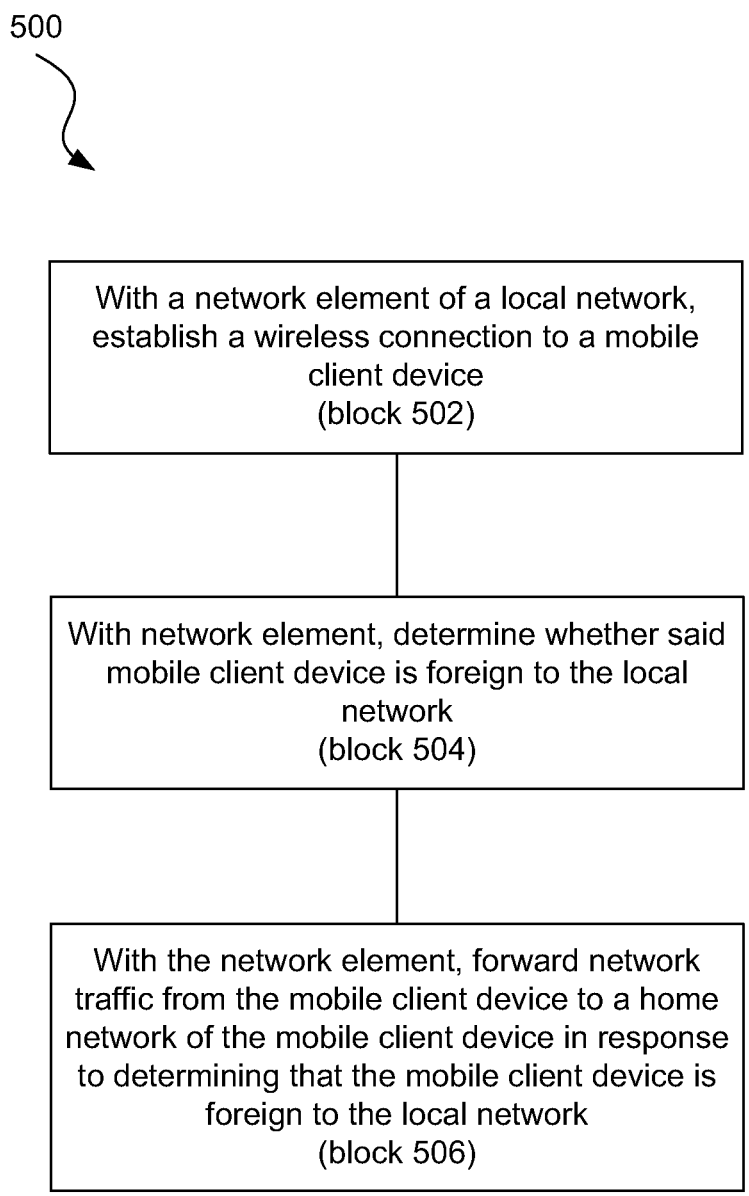
FIG. 5 is a flowchart showing an illustrative method for mobile traffic management, according to one example of principles described herein.

FIG. 5 is a flowchart showing an illustrative method for mobile traffic management. According to certain illustrative examples, the method includes, with a network element of a local network, establishing (block 502) a wireless connection to a mobile client device, determining (block 504) whether the mobile client device is foreign to the local network, and forwarding (block 506) network traffic from the mobile client device to a home network of the mobile client device in response to determining that the mobile client device is foreign to the local network. The local network and the home network belong to the same distributed network.

In conclusion, through use of methods and systems embodying principles described herein, an organization can maintain a distributed network system while still providing users with the full services of their home network even when they roam. Thus the convenience of having home network services provided no matter where a user connects can be achieved while taking achieved while taking advantage of the lower cost and more efficient distributed network structure.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for mobile computer networking on a distributed network, the method comprising:
   with a network element of a local network, establishing a connection to a mobile client device;
   with said network element, determining a home network of said mobile client device without using a logical address of a packet of data from said mobile client device, wherein determining the home network includes:
      examining a Service Set Identifier (SSID) associated with said mobile client device, and
      consulting a table within said network element that indicates an output port of the network element for the SSID; and with said network element, forwarding network traffic from said mobile client device to the home network of said mobile client device through the indicated output port.

2. The method of claim 1, wherein determining said home network of said mobile client device comprises:
with said network element, sending a request to an authorization server; and
with said network element, receiving a response from said authorization server, said response including data indicating said home network for said mobile client device.

3. The method of claim 1, wherein forwarding said network traffic from said mobile client device to said home network comprises forwarding said network traffic to a network controller, said network controller using a network tunnel to forward said network traffic to said home network.

4. The method of claim 1, wherein forwarding said network traffic from said mobile client device to said home network comprises routing said network traffic directly to a home network element of said home network.

5. The method of claim 1, further comprising:
receiving, at the network element, network traffic intended for said mobile client device from said home network.

6. The method of claim 1, wherein forwarding network traffic from said mobile client comprises:
examining a source physical address of a packet of data from said mobile client device, and
forwarding said packet of data to the output port of said network element based on a forwarding table correlating source physical addresses with output ports.

7. A network element comprising:
a processor; and
a memory communicatively coupled to said processor,
wherein the memory stores computer readable instructions that when executed by the processor cause said processor to:
establish a connection to a mobile client device;
determine a home network of said mobile client device without using a logical address of a packet of data from said mobile client device through:
examination of a Service Set Identifier (SSID) associated with said mobile client device, and
consultation of a table within said network element that indicates an output port of the network element for the SSID; and
forward network traffic from said mobile client device to the home network of said mobile client device through the indicated output port.

8. The network element of claim 7, wherein to determine said home network of said mobile client device, said computer readable instructions are further to cause the processor to:
send a request to an authorization server; and
receive a response from said authorization server, said response including data indicating said home network for said mobile client device.

9. The network element of claim 7, wherein to forward said network traffic from said mobile client device to said home network, said computer readable instructions are further to cause the processor to forward said network traffic to a network controller, wherein said network controller is to use a network tunnel to forward said network traffic to said home network.

10. The network element of claim 7, wherein to forward said network traffic from said mobile client device to said home network, said compute readable instructions are further to cause the processor to route said network traffic directly to a home network element of said home network.

11. The network element of claim 7, wherein said network element is to receive network traffic intended for said mobile client device from said home network.

12. The network element of claim 7, wherein to forward said network traffic from said mobile client device to said home network, said processor is computer readable instructions are further to cause the processor to:
examine a source physical address of a packet of data from said mobile client device, and
forward said packet of data to the output port of said network element based on a forwarding table correlating source physical addresses with output ports.

13. A method for forwarding traffic from mobile client devices which roam between a number of interconnected local networks in a distributed network, the method comprising:
with a network element of one of said local networks, establishing a connection to a mobile client device;
with said network element, determining a home network of said mobile client device without using a logical address of a packet of data from said mobile client device, including:
examining a Service Set Identifier (SSID) associated with said mobile client device, and
consulting a table within said network element that indicates an output port of the network element for the SSID; and
with said network element, forwarding network traffic from said mobile client device to said home network in response to determining that said network element is not associated with said home network;
wherein said mobile client device is to receive a number of network services from only said home network; and
wherein said local network and said home network belong to said distributed network.

14. The method of claim 13, wherein determining the home network of the mobile client device comprises:
sending a request to an authorization server; and
receiving a response from the authorization server, wherein the response includes data indicating the home network for said mobile client device.

* * * * *

UNITED STATES PATENT AND TRADEMARK OFFICE
CERTIFICATE OF CORRECTION

| | | |
|---|---|---|
| PATENT NO. | : 8,611,358 B2 | Page 1 of 1 |
| APPLICATION NO. | : 13/081310 | |
| DATED | : December 17, 2013 | |
| INVENTOR(S) | : Stephane Laroche et al. | |

It is certified that error appears in the above-identified patent and that said Letters Patent is hereby corrected as shown below:

In the Claims

In column 10, line 10, in Claim 10, delete "compute" and insert -- computer --, therefor.

Signed and Sealed this
Sixth Day of May, 2014

Michelle K. Lee
*Deputy Director of the United States Patent and Trademark Office*